3,310,382
BIURET REAGENT
George R. Kingsley, 621 Bonhill Road,
Los Angeles, Calif. 90049
No Drawing. Filed Feb. 4, 1963, Ser. No. 256,132
8 Claims. (Cl. 23—230)

The present invention relates to novel and improved biuret reagents. More particularly, the present invention relates to solid, "one piece" biuret reagents which are readily soluble in water.

Biuret reactions for protein determinations, e.g., the determination of the amount of protein in blood and urine, have become well known since first introduced about fifty years ago. In general, most such biuret reagents involve the use of a copper salt and a base, e.g., a copper sulfate and sodium hydroxide. These materials were originally added separately to the protein solution to be tested; the amount of protein being indicated by the intensity of the red or purple color which is developed. However, this method was subject to many deficiencies, among which was the tendency of cupric hydroxide or protein to precipitate, thereby causing turbidity and incomplete reaction. Furthermore, the separate addition of the reagents resulted in lack of uniformity in proportions and mixing of the solutions which rendered reproducibility of color formation extremely difficult, if not impossible.

Several suggestions for the preparation of a "one piece," e.g., single solution, biuret reagent have come forward, the most successful being a single solution comprising copper sulfate and a relatively high concentration of sodium hydroxide. However, although this solution was quite satisfactory for testing purposes, it had the disadvantage of requiring that separate solutions of each reagent be made up in order to prepare it. Furthermore, there are obvious commercial difficulties inherent in attempting to ship packaged solutions from location to location.

Thus, it is a principal object of the present invention to provide a "one piece" biuret reagent which is stable, effective and capable of being easily transported.

It is another object of the present invention to provide a solid, e.g., powdered, "one piece" biuret reagent comprising a copper salt, a base and a buffer or stabilizing agent.

It is still another object of the present invention to provide a process for protein determination which employs the biuret reagent of the present invention.

Other objects and advantages of the present invention, it is believed, will be readily apparent from the following detailed description of specific embodiments thereof.

Briefly, the present invention comprises a biuret reagent which comprises a copper salt, a basic compound such as a base or basic salt, and a tartrate, preferably sodium tartrate, which functions as a buffer or stabilizing agent. While certain other tartrates may be used, sodium tartrate is particularly preferred because it does not produce extraneous color and is inexpensive and easily obtained. The ingredients of the biuret reagent are combined according to certain molecular proportions. The biuret reagent of the present invention may be prepared in dry, e.g., powdered, form. This dry product is easily and completely soluble in distilled water. The dry product is stable for indefinite lengths of time and may be packaged and shipped as a powder, pill, tablet, etc. Upon the addition of an appropriate amount of water, all of the components of the reagent of the present invention will dissolve within two to twenty minutes (depending upon the ratio of the components) to produce a clear, stable biuret reagent liquid which is complete as a single reagent and does not require the addition of other ingredients.

The liquid reagent so produced is completely stable and will withstand 100° C. for two minutes without decomposition. Among the basic compounds which may be used in the present invention are lithium hydroxide, sodium orthophosphate, sodium carbonate and sodium metasilicate. In general, the preferred copper salt is copper sulfate, but other copper salts may be used.

The present invention is further illustrated by the following examples.

*Example 1*

A biuret reagent having the following composition was prepared:

| | Grams |
|---|---|
| Sodium orthophosphate ($Na_3PO_4 \cdot 12H_2O$) | 18 |
| Anhydrous copper sulfate | 0.10 |
| Sodium tartrate ($Na_2C_4H_4O_6 \cdot 2H_2O$) | 0.60 |

*Example 2*

A biuret reagent having the following composition was prepared:

| | Grams |
|---|---|
| Lithium hydroxide | 3.60 |
| Anhydrous copper sulfate | 0.10 |
| Sodium tartrate ($Na_2C_4H_4O_6 \cdot 2H_2O$) | 0.60 |

*Example 3*

A biuret reagent having the following composition was prepared:

| | Grams |
|---|---|
| Anhydrous sodium carbonate | 10.64 |
| Anhydrous copper sulfate | 0.06 |
| Sodium tartrate ($Na_2C_4H_4O_6 \cdot 2H_2O$) | 0.15 |

*Example 4*

A biuret reagent similar to that described in Example 1 was prepared, with the exception that an equal molecular amount of sodium metasilicate ($Na_2SiO_3 \cdot 9H_2O$) was substituted for the sodium orthophosphate of Example 1.

*Example 5*

For use in protein determination, the biuret reagents of Examples 1–4 were each dissolved in 100 ml. of distilled water. 2 ml. of 16–28% sodium sulfate solution containing serum proteins (equal to about 0.1 ml. of serum) were added to 4 ml. of the biuret reagent solutions. The combined solutions were mixed and allowed to stand for 30 minutes at room temperature at which time the color development was complete and stable. The color of the solution was then measured spectrophotometrically against blanks prepared from the same biuret reagents to which no protein-containing solution had been added at 540 mu transmittance. The intensity of the color obtained was directly proportional to the protein concentration.

The biuret reagents of the present invention may be used in any standard biuret procedure as described in the relevant literature for total protein or globulin fractionation. For example, sodium sulfate may be omitted and an equal volume of water used for total protein determination. Completion of color development may be shortened by heating for one minute at 60–100° C. which completes color development within this time.

Although copper sulfate is preferred for the practice of the present invention, any soluble copper salt will produce satisfactory results. For example, cupric chloride, nitrate, selenate, acetate, bromide, metaborate, bromate, chlorate, dichromate, fluosilicate, formate, lactate and salicylate may be used.

Copper tartrate is not satisfactory because of its poor solubility. Copper citrate is unsatisfactory because the citrate ion appears to reduce the copper ion to the insoluble oxide or other insoluble compound.

Sodium tartrate is the preferred buffering or stabilizing agent of the present invention. However, other soluble buffering or stabilizing agents which do not interfere with color formation may be used. In this regard, it has been found that potassium salts interfere in the production of color by reducing the color produced or by producing extraneous colors. For this reason, use of potassium salts in either the basic compound or the buffer should be avoided. Furthermore, compounds which are not stable and which form copper precipitates such as the salicylate, succinate, formate, citrate and dichromate salts of sodium should not be used in the practice of the present invention. In addition, the tartrates of bismuth, cadmium, manganese, cobalt, copper, lead, and silver have been found to be insufficiently soluble for use in the present invention while ammonium tartrate is unsatisfactorily unstable.

The proportions of the ingredients of the biuret reagent of the present invention may be varied within certain limits. For example, in the composition disclosed in Example 1, the sodium orthophosphate may be present in a range of about 12.0 to about 24.0 grams, the copper sulfate may be present in an amount of about 0.06 to about 0.18 gram and the sodium tartrate may be present in an amount of about 0.3 to about 0.9 gram. The sodium metasilicate of Example 4 may be substituted in equal molecular proportions, i.e., about 9.0 to about 18.0 grams, for the sodium orthophosphate of Example 1. In the composition of Example 2, the lithium hydroxide may be present in an amount of between about 2.2 to about 5.0 grams, the copper sulfate may be present in an amount of about 0.06 to about 0.18 gram and the sodium tartrate may be present in an amount of about 0.3 to about 0.9 gram. In the composition in Example 3, the sodium carbonate may be present in an amount of about 7.60 to about 12.16 grams, the copper sulfate may be present in an amount of about 0.06 to about 0.18 gram and the sodium tartrate may be present in an amount of about 0.15 to about 0.9 gram. When the ingredients of the biuret reagent of the present invention are present in amounts within these ranges, the reagent may be dissolved in 100 ml. of distilled water to make up the liquid reagent.

Having fully described the present invention, it is to be understood that it is not to be limited to the specific details set forth, but is of the full scope of the appended claims.

I claim:

1. A substantially dry biuret reagent comprising a soluble copper salt, a basic compound selected from the group consisting of sodium orthophosphate, lithium hydroxide, sodium carbonate and sodium metasilicate; and sodium tartrate.

2. A substantially dry biuret reagent comprising copper sulfate; a basic compound selected from the group consisting of sodium orthophosphate, lithium hydroxide, sodium carbonate and sodium metasilicate; and sodium tartrate.

3. A substantially dry biuret reagent comprising about 0.06 to about 0.18 part by weight copper sulfate; a basic compound selected from the group consisting of about 12.0 to about 24.0 parts by weight sodium orthophosphate, about 9.0 to about 18.0 parts by weight sodium metasilicate, about 2.2 to about 5.0 parts by weight lithium hydroxide and about 7.6 to about 12.16 parts by weight sodium carbonate; and about 0.15 to about 0.9 part by weight sodium tartrate.

4. A substantially dry biuret reagent comprising about 0.06 to about 0.18 part by weight copper sulfate; about 12.0 to about 24.0 parts by weight sodium orthophosphate; and about 0.3 to about 0.9 part by weight sodium tartrate.

5. A substantially dry biuret reagent comprising about 0.06 to about 0.18 part by weight copper sulfate; about 9.0 to about 18.0 parts by weight sodium metasilicate; and about 0.3 to about 0.9 part by weight sodium tartrate.

6. A substantially dry biuret reagent comprising about 0.06 to about 0.18 part by weight copper sulfate; about 2.2 to about 5.0 parts by weight lithium hydroxide and about 0.3 to about 0.9 part by weight sodium tartrate.

7. A substantially dry biuret reagent comprising about 0.06 to about 0.18 part by weight copper sulfate; about 7.6 to about 12.16 parts by weight sodium carbonate and about 0.15 to about 0.9 part by weight sodium tartrate.

8. A process for protein determination comprising adding a solid, substantially dry biuret reagent comprising a soluble copper salt, a basic compound selected from the group consisting of sodium orthophosphate, lithium hydroxide, sodium carbonate and sodium metasilicate; and sodium tartrate to water to form a biuret reagent solution; adding two parts by volume of a protein-containing solution to four parts by volume of the biuret reagent solution; mixing said protein-containing solution and said biuret reagent; allowing said mixture to stand for a time sufficient for completion of color development; and measuring the intensity of said color.

References Cited by the Examiner

UNITED STATES PATENTS 2,387,244  10/1945  Compton et al. _____ 252—408

OTHER REFERENCES

Gornall et al.: J. of Bio. Chem., vol. 177, 1949, pages 751–766.

MORRIS O. WOLK, *Primary Examiner.*

Z. PAROCZAY, *Assistant Examiner.*